Nov. 10, 1964  V. PRIBIL  3,156,056
VISUAL CONTROL BOARD
Filed Jan. 11, 1962

INVENTOR.
VICTOR PRIBIL
BY
Benjamin Swadler
ATTORNEY

3,156,056
VISUAL CONTROL BOARD
Victor Pribil, 120 Iris Ave., Floral Park, N.Y.
Filed Jan. 11, 1962, Ser. No. 165,526
2 Claims. (Cl. 40—63)

This invention relates to a visual control board having magnetic indicators thereon and providing a visual record suitable for use for organization planning, sales or production scheduling and control of traffic, media programming or for like purposes.

It is among the objects of this invention to provide a visual control board which can be manufactured economically, is compact and simple in design, and which board is constructed to removably receive and support magnetic indicators on predetermined areas on the face of the board, thereby providing the desired information upon inspection.

A further object of the invention is to provide such a board so constructed that information appearing on the board may be readily changed, to permit efficient utilization of the control board to accommodate changes in the information to be imparted to the observer.

Other objects and advantages of this invention will be apparent from the following detailed description thereof.

In accordance with the invention, a visual control board is provided comprising a rigid, flat support constituted of a magnetic material and a transparent plastic sheet on the magnetic support, which sheet bears permanent markings on the surface contacting the support dividing the said surface into predetermined areas for receiving magnetic indicators, and the plastic sheet having a thickness such that (a) the permanent markings are visible through the sheet and (b) the magnetic indicators are held on the board by magnetic attraction notwithstanding the intervening plastic sheet. Magnetized elements are secured to at least the four corners of the plastic sheet, preferably in the form of strips secured to at least two opposite edges of the plastic sheet and extending the entire length of such edges, which elements are magnetically attracted to the support, thereby removably mounting the plastic sheet on the support in flat, wrinkle-free superposed relation therewith. The permanent markings on the underside of the plastic sheet define areas for the reception of magnetic indicators removably supported on the plastic sheet to indicate sales, production or other records; such permanent markings positioned on the surface (back) of the plastic sheet adjacent the support thereof are not blurred or otherwise damaged by repeated movement of the magnetic indicators on the obverse side of the sheet during the course of ordinary handling of the control board.

In the accompanying drawing, showing for purposes of illustration a preferred embodiment of this invention without limiting the claimed invention to such embodiment, FIGURE 1 is a plan view of a visual control board embodying the invention;

Figure 3:
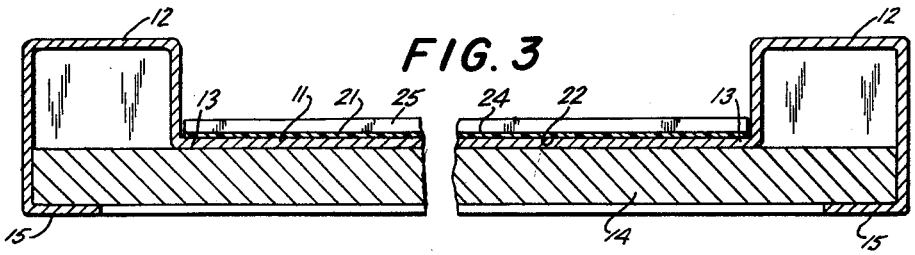
FIGURE 3 is a fragmentary horizontal section, enlarged relative to FIGURE 1, taken in a plane passing through line 3—3 in FIGURE 1.

In the drawing, the visual control board shown comprises a magnetically responsive support 11 desirably constituted of steel, iron or other material, preferably metal, to which a magnetic indicator is attracted and which is referred to herein as a magnetic material. The support 11 is a flat sheet having a pair of raised side borders or frame elements 12 lengthwise of and integral with one pair of opposite side edges 13 of the support. As shown in FIGURE 3, the frame elements 12 are generally rectangular in cross-section. A reinforcing board 14 preferably of wood fibers or wall board is held in place in contact with the support 11 by the flanges 15 on the extremities of frame elements 12. Preferably this board 14 is bonded to the support 11 by a suitable adhesive. Positioned lengthwise of the top and bottom edges 16 and 16' of the support 11, respectively, are a pair of elongated U-shaped edge clamps or channels 17 and 17', which channels snugly engage the top and bottom edges, respectively, and abut at their ends the longitudinally extending frame elements 12. The support 11 is thus attractively framed by the longitudinal frame elements 12 and the U-shaped channels 17 and 17' with the frame elements 12 providing convenient handles or hand engaging portions for manipulation of the board.

Desirably, mounting loops or eyes 18 are secured to the top channel 17 to mount the control board on a wall or other surface. In accordance with the invention, a transparent plastic sheet 21 is removably positioned on the magnetic metal support 11 between the frame elements 12 and the channels 17 and 17'. This plastic sheet is about equal in area to that of the support 11. The back or underside 22 of sheet 21 contacts the support 11, back or underside 22 of sheet 21 contacts the support 11, and has thereon permanent markings indicated, for example, as a grid 23 in the drawing, which defines predetermined areas on the face of the control board for receiving magnetic indicators. The grid 23 is permanently formed on the back 22 of the transparent plastic sheet, as by printing, silk screening or other suitable method. It will be understood that, if desired, permanent markings other than the grid 23 can be applied to the back of transparent plastic sheet 21 to divide the face of the control board into predetermined areas for receiving magnetic indicators, in accordance with the particular use for which the visual control board is designed.

The transparent plastic sheet 21 has a thickness such that the grid 23 or other permanent markings are visible through the sheet, and such that the lines of magnetic force between the magnetic indicators placed thereon, as described hereinafter, and the underlying magnetic support 11 are sufficient to maintain the indicators on the plastic sheet. Sheets having thicknesses less than about 0.01 inch give good results.

The transparent sheet is constituted of a stabilized film which is wrinkle resistant and substantially unaffected by moisture or temperature changes; preferably the face 24 of the sheet has a surface which permits, or which has been treated to permit, writing thereon and erasures therefrom in order that temporary data can be entered on the control board, as may be desired. One form of transparent plastic sheet found particularly useful for the practice of the present invention is constituted of a polyester film, e.g., polyethylene terephthalate, having a thickness of from about 0.002 to about 0.008 inch and having a matte surface on one side permitting writing and erasure, marketed under the trade designation "Stabilene Film" by the Keuffel & Esser Co.

The transparent plastic sheet 21 is removably mounted on the magnetic support 11 by magnetized strips 25, two of which are shown in the drawing, secured to the top face 24 of the top and bottom edges of the plastic sheet 21 and extending the entire length of such edges. The magnetized strips 25 are suitably secured to the face of the plastic sheet 21, e.g., by an adhesive, as shown in the drawing, or by rivets, snap fasteners, etc. The strips comprise a magnetized metal, plastic, ceramic or similar material which is magnetically attracted to the support 11 through the thickness of the plastic sheet; one magnetized material found particularly useful, comprises a mixture of a plasticized polyvinyl chloride resin (sold under the trade designation "Koroseal") admixed with finely divided barium ferrite particles.

The magnetized strips 25 removably mount the transparent plastic sheet 21 on the support 11 in flat wrinkle-free superposed relation. If desired, magnetized elements can be secured to the plastic sheet at only the four corners thereof, or strips 25 can be secured to the sheet adjacent, and extending along the entire length of, three or all four side edges of sheet 21 in order to insure adhering the sheet to the metal support in flat wrinkle-free relation. By positioning the holding strips 25 or other magnetized elements used for this purpose on the face of the plastic sheet 21, a smooth wrinkle-free surface is obtained when this plastic sheet is positioned on the support 11 with the entire area of the sheet 21 lying flat on the support 11.

Figure 1:
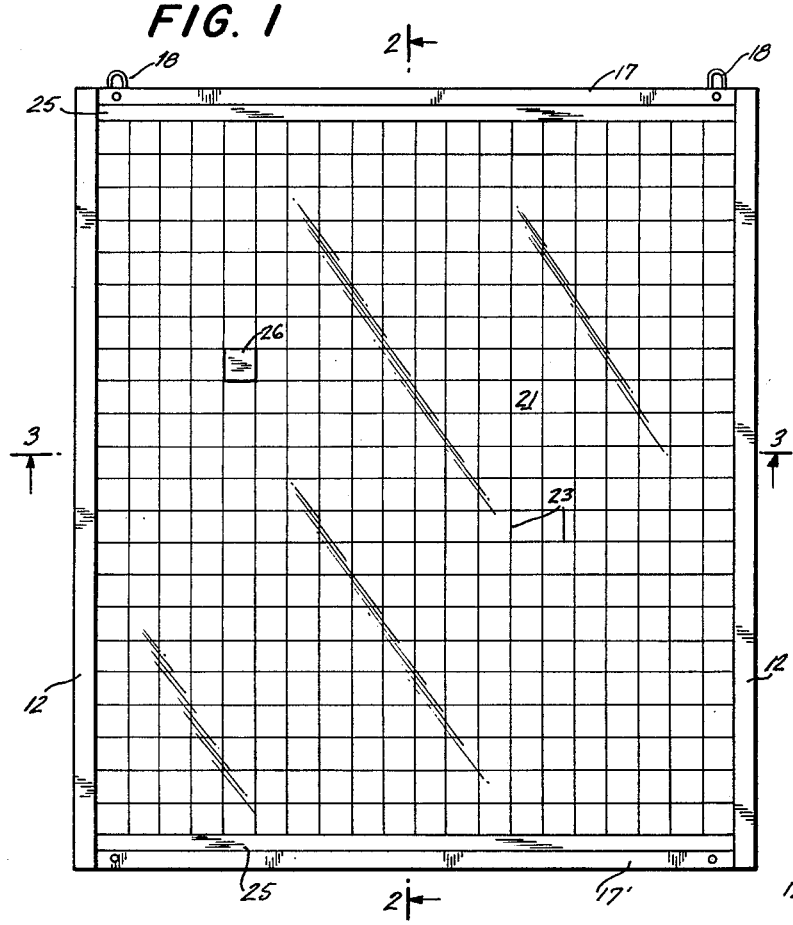
Figure 2:
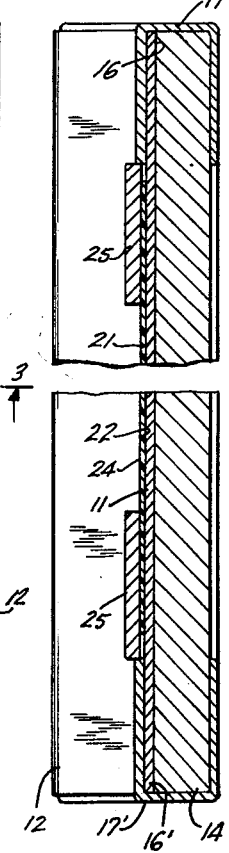
FIGURE 2 is a fragmentary vertical section of the board, enlarged relative to FIGURE 1, taken in a plane passing through line 2—2 in FIGURE 1.
Figure 4:
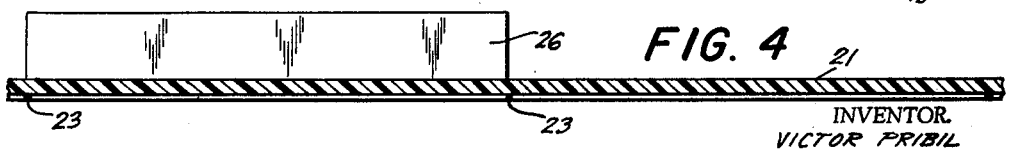
FIGURE 4 is a fragmentary section through the transparent plastic sheet of the control board, further enlarged relative to the scale of FIGURES 2 and 3, showing a magnetic indicator supported thereon.

Magnetic members or indicators, one of which is shown at 26 in FIGURES 1 and 4, can be placed on the control board aligned with the predetermined areas defined by grid 23 on the face 22 of the plastic sheet and held in place by magnetic attraction. Any pertinent indicia may be imprinted or otherwise affixed to the indicators 26 thus mounted on the control board to provide a visual record or schedule suitable for indicating or controlling any desired operation. When desired, the indicators 26 are manually slid along the surface of the transparent plastic sheet 21, or are removed from the sheet and replaced in different predetermined positions, to indicate changed conditions, and this without blurring or otherwise damaging the grid 23 or other permanent markings formed on the underside of the plastic sheet.

The structure herein described permits utilization of one and the same board with different plastic sheets having different arrangements of defined predetermined areas for the reception of magnetic indicators to apply to different situations. Thus the user of the board can readily remove a plastic sheet and replace it by another with the greatest of ease and with assurance that the new or different plastic sheet will be accurately aligned on the supporting surface. This feature of the invention permits utilization of one and the same board with a plurality of plastic sheets each of which is designed for a given situation confronting the user.

Since different embodiments of the visual control board of the invention can be made without departing from the scope thereof, it is intended that all matter contained in the above description or shown in the accompanying drawing shall be interpreted as illustrative and not in a limiting sense.

What is claimed is:

1. A visual control board arranged to removably receive and support magnetic indicators on predetermined areas on the face thereof, said board comprising a substantially rectangular rigid, flat support constituted of a magnetic material, a transparent plastic sheet on said support, the face of the plastic sheet in contact with said support having thereon permanent markings which divide the face into said predetermined areas for receiving the magnetic indicators and said plastic sheet having a thickness such that said permanent markings are visible through the sheet, and relatively long, narrow, magnetized strips secured to at least two opposite edges of said plastic sheet extending the entire length of said edges, said strips being magnetically attracted to said support at all four corners and thereby removably mounting the transparent sheet on the support in flat wrinkle-free superposed relation therewith.

2. The control board as defined in claim 1, in which the transparent plastic sheet is constituted of a polyester film and each of said magnetized strips is constituted of a mixture of a plasticized polyvinyl chloride and finely divided barium ferrite particles.

References Cited in the file of this patent

UNITED STATES PATENTS

| | | |
|---|---|---|
| 628,932 | Flinner | July 18, 1899 |
| 2,177,905 | McKeehan | Oct. 31, 1939 |
| 2,600,505 | Jones | June 17, 1952 |
| 2,668,370 | Trimble | Feb. 9, 1954 |
| 2,748,498 | Stuart et al | June 5, 1956 |
| 2,917,838 | Neugass | Dec. 22, 1959 |